US006682708B1

United States Patent
Zeuner et al.

(10) Patent No.: US 6,682,708 B1
(45) Date of Patent: Jan. 27, 2004

(54) GAS GENERATOR

(75) Inventors: Siegfried Zeuner, München (DE); Achim Hofmann, Polling (DE); Roland Schropp, Tegernheim (DE); Josef Werneth, Ampfing (DE); Andreas Zehentmeier, Ampfing (DE)

(73) Assignee: TRW Airbag Systems GmbH & Co. KG, Aschau/Inn (DE)

( * ) Notice: Subject to any disclaimer, the term of this patent is extended or adjusted under 35 U.S.C. 154(b) by 468 days.

(21) Appl. No.: 09/595,837

(22) Filed: Jun. 16, 2000

(30) Foreign Application Priority Data

Jun. 18, 1999 (DE) ........................ 299 10 708 U
Aug. 30, 1999 (DE) ........................ 299 15 178 U

(51) Int. Cl.⁷ ........................ A61L 9/00; B60R 21/26; B60R 21/28; C06D 5/00
(52) U.S. Cl. ........................ 422/305; 422/306; 422/307; 280/737; 280/741; 102/530; 102/531
(58) Field of Search ........................ 422/305–308, 422/311–312; 280/737, 741; 102/530, 531

(56) References Cited

U.S. PATENT DOCUMENTS

| 5,501,152 A | * | 3/1996 | Zeuner et al. |
| 5,659,295 A | * | 8/1997 | Renfroe et al. |
| 5,794,973 A | * | 8/1998 | O'Loughlin et al. |
| 5,799,973 A | * | 9/1998 | Bauer et al. |
| 5,931,496 A | * | 8/1999 | Brede et al. |
| 6,042,146 A | * | 3/2000 | Bauer et al. |
| 6,485,053 B2 | * | 11/2002 | Fujimoto et al. |

FOREIGN PATENT DOCUMENTS

| DE | 2364268 B2 | 10/1979 | |
| DE | 4141902 A1 | 7/1992 | |
| DE | 19533606 A1 | 3/1996 | |
| DE | 19507208 A1 | 9/1996 | |
| DE | WO 97/26159 | * 7/1997 | ........... B60R/21/26 |
| DE | 19602008 A1 | 7/1997 | |
| DE | 19753811 A1 | 6/1998 | |
| DE | 29900590 U1 | 5/1999 | |

* cited by examiner

Primary Examiner—Robert J. Warden, Sr.
Assistant Examiner—Monzer R. Chorbaji
(74) Attorney, Agent, or Firm—Tarolli, Sundheim, Covell & Tummino L.L.P.

(57) ABSTRACT

The invention relates to a gas generator for generating gases, comprising a housing which has an interior space and at least one combustion chamber filled with a predetermined quantity of solid propellant. The propellant consists of a plurality of solid propellant parts arranged in the combustion chamber in an irregular manner. The compressed gas is stored in a predetermined quantity in the combustion chamber and the combustion chamber constructed as a pressure chamber sealed hermetically toward outside in a non-activated state of the gas generator.

15 Claims, 5 Drawing Sheets

GAS GENERATOR

TECHNICAL FIELD

The invention relates to a gas generator.

BACKGROUND OF THE INVENTION

Gas generators which only operate with pyrotechnic solid propellant generate extremely hot gas. It is aimed that gas generators generate gases with a low temperature, in order to reduce the thermal stress of the vehicle occupant restraint system, which is arranged downstream of the gas generator. For this reason, so-called hybrid gas generators have been developed, in which in addition to solid propellant filling a combustion chamber also a separate chamber (not defining or co-defining the combustion chamber) is present which is filled with compressed gas. The hot gas and the compressed gas become mixed on activation of the gas generator, so that the hot gas is cooled. However, such hybrid gas generators require a very large structural space. These housings of the hybrid gas generators, constructed so as to be pressure-tight, are characterized by a high weight and unfavorable structural sizes owing to the high strength requirements. In addition, these pressure-tight housings require a number of gas-tight seals at component transitions, which requires relatively high manufacturing costs.

BRIEF SUMMARY OF THE INVENTION

It is an object of the present invention to provide a gas generator occupying a small space, which with the same structural volume provides a higher output than a corresponding purely pyrotechnic gas generator. In addition to the reduced structural space, the gas generator provided according to the invention is reduced in its overall weight, i.e. is lighter and provides the possibility of manufacturing various gas generators within one production line and according to a modular concept.

This problem is solved in a gas generator which comprises a housing which has an interior space and at least one combustion chamber filled with a predetermined quantity of solid propellant. The propellant consists of a plurality of solid propellant parts, e.g. bodies in tablet form or extruded shaped bodies, which are arranged in the combustion chamber in an irregular, i.e. chaotic manner as the propellant parts are thrown or poured into the combustion chamber. The compressed gas is stored in a predetermined quantity in the combustion chamber and the combustion chamber is constructed as a pressure chamber sealed hermetically towards outside in a non-activated state of the gas generator.

With the invention, therefore, the combustion chamber of a gas generator actually only operating with solid propellant is used for accommodating additional compressed gas. Between the propellant units or parts which are usually present in the form of tablets or other pressed forms (e.g. extruded shaped bodies) in fact sufficient empty space is still present in order to be able to fill this with compressed gas. These empty spaces add up as a whole to such a high unused volume that additionally introduced compressed gas can actually lead to an increase in output by more than 10% with the same structural space and the same weight. In addition, the compressed gas can reduce the temperature of the outflowing gas mixture and possibly even lead to an afterburning. Through a suitable coordination of solid propellant and compressed gas, very low emissions of harmful substances can be achieved, which are much lower than those of the purely pyrotechnic systems.

In fact, hybrid gas generators already exist, in which the combustion chamber is arranged in a pressure chamber surrounding the combustion chamber and the combustion chamber is open to the pressure chamber and also compressed gas is present in the combustion chamber. In these systems, tie combustion chamber is only therefore open towards the pressure chamber, however, so that no resistance is offered to the pressure wave and the compressed gas which are generated on igniting of the solid propellant, on overflowing into the pressure chamber. This resistance would in fact be present if the combustion chamber were closed by a bursting membrane with respect to the pressure chamber, as has also already been proposed elsewhere in the prior art.

In the gas generator according to the invention, which is constructed in one or more stages, however, no pressure chamber containing gas is present around the combustion chamber. The solid propellant in the gas generator according to the invention generates more moles gas than moles compressed gas are stored in it.

According to an embodiment, the combustion chamber is constructed as a separate, gas-tight can which is able to be acted upon by pressure, which can is integrated in the interior space of the gas generator housing. This gas-tight can is provided as a separate component and can be integrated according to requirements as a combustion chamber into the respective gas generator series.

The pressure-tight gas can is constructed for example from a gas-tight foil or from a thin sheet metal material. The gas-tight can follows in its outer shape the inner shape of the gas generator housing.

With the use of combustion chambers in the form of gas-tight cans, a bursting means which is arranged in the overflow zone of the gases in the gas generator housing, is dispensed with, because the gas-tight can has a sufficiently thin wall and breaks open in the region of the overflow openings.

The gas-tight can stores compressed gas with a pressure in the range of 10 to 20 bar.

The construction of the combustion chamber in the form of a gas-tight can offers the advantage that in a relatively simple manner a solid propellant can be surrounded by a fixedly defined gas mixture.

The optional equipping of gas generators with separate combustion chambers in can form with or without additional gas within a production line offers the advantage of high flexibility with manufacture of various gas generators using as many identical parts as possible.

Preferably, the compressed gas is a gas mixture containing oxygen. The oxygen opens up the possibility of a subsequent combustion.

If, in addition, the solid propellant in the gas generator is underbalanced with respect to oxygen, then the oxygen can make possible an oxidation of the resulting CO and $H_2$ to $CO_2$ or water with, at the same time, very low $NO_x$ values.

The compressed gas is stored with a pressure of more than 10 bar, even of approximately 200 bar in the combustion chamber. With the use of combustion chambers in the form of gas-tight cans, the compressed gas is stored at a pressure of 10 to 20 bar, i.e. a pressure which lies below the usual pressure of 240 bar for hybrid gas generators. Thereby, the strength requirements for the combustion chamber wall, constructed as pressure chamber wall, are substantially lower than in hybrid gas generators.

DETAILED DESCRIPTION OF THE PREFERRED EMBODIMENTS

Figure 1:
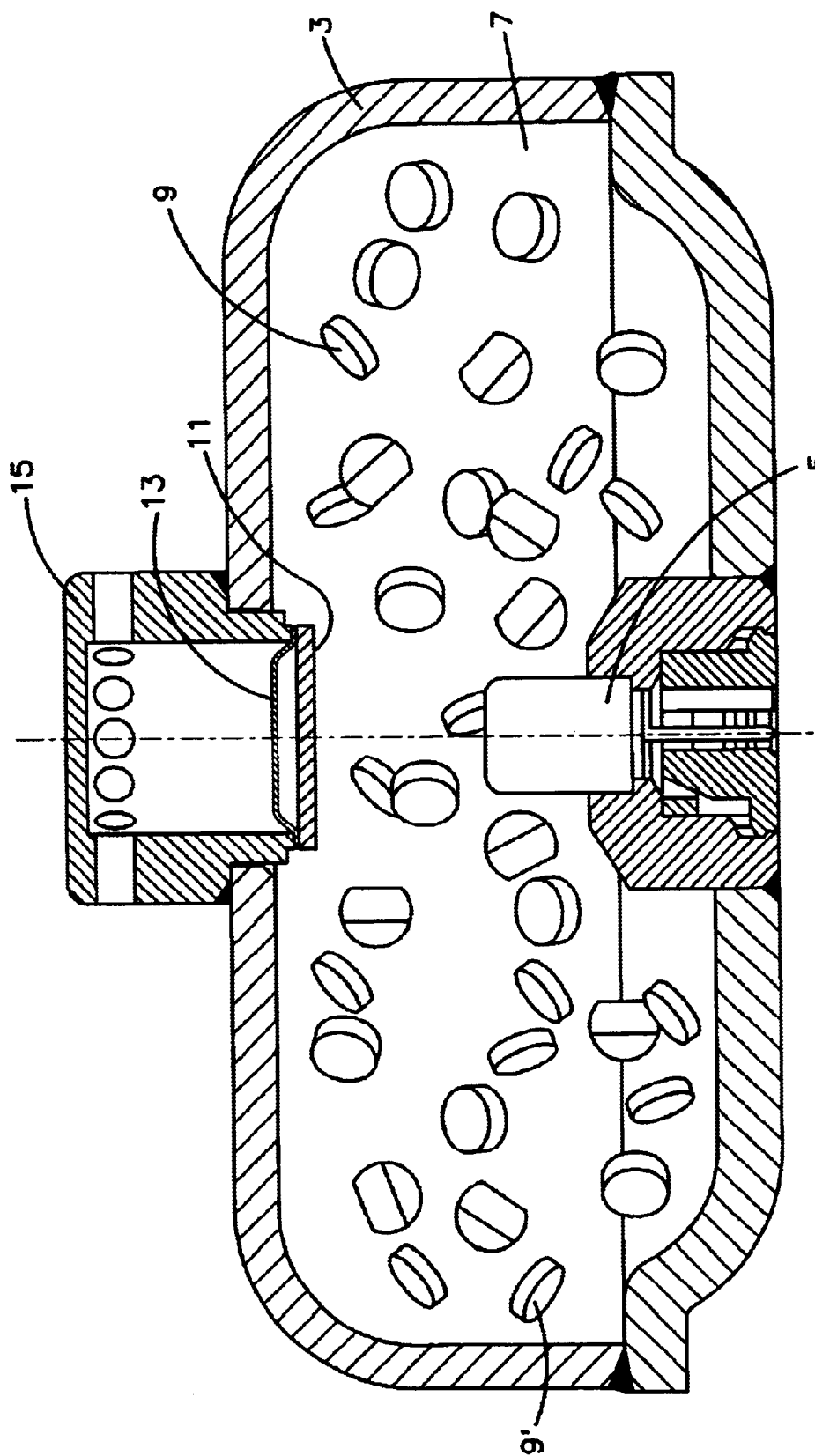
FIG. 1 shows a cross-section through a schematically illustrated driver's gas generator according to the invention.

In FIG. 1 a driver's gas generator is illustrated, which has an outer housing 3 which is gas- and pressure-tight. In the housing 3 an igniter device 5 is accommodated. Except for the igniter device 5, the entire interior space of the housing 3 forms a combustion chamber 7 which is filled with solid propellant 9 consisting of a plurality of solid propellant parts in tablet form or in the form of extruded shaped bodies 9'. The combustion chamber 7 is the part of the gas generator filled with propellant, here solid propellant. The propellant parts fill the combustion chamber in an irregular, i.e. chaotic manner. On the side lying opposite the igniter device 5, a screen 11 is arranged and downstream therefrom a bursting membrane 13 is arranged. A diffuser is designated by 15.

Compressed gas, containing oxygen, with a pressure of approximately 20 bar is accommodated in the combustion chamber 7. As solid propellant a propellant based on 5-aminotetrazol/$KNO_3$ is used. With a combustion chamber volume of 45 $cm^3$, a propellant mass of 55 g, a packing density for the propellant of 0.6 $g/cm^3$, in the driver's gas generator shown in FIG. 1, with a pressure of 200 bar 0.17 mole compressed gas can be accommodated. The total moles of propellant together with the compressed gas can be increased from 0.90 to 1.07 through the introduction of the compressed gas compared with an identically constructed gas generator without compressed gas. Thereby, an increase in the gas yield by just under 20% results compared with a corresponding purely pyrotechnic gas generator.

The mode of operation of the gas generator according to the invention is explained hereinbelow. After the activation of the igniter unit 5, the solid propellant 9 is also ignited and generates hot gas, including also CO and $H_2$. This gas can oxidize to $CO_2$ and water with the oxygen contained in the compressed gas. As the quantity of solid propellant is underbalanced, low $NO_x$ values are produced.

After the burning of a portion of the propellant, the pressure in the combustion chamber 7 becomes so high that the bursting membrane 13 breaks and the resulting gas mixture arrives via the then exposed opening into the diffuser 15 and from there into a gas bag restraint system. The screen 11 prevents an outflow of hot particles which arise with the burning of the propellant.

Figure 2:
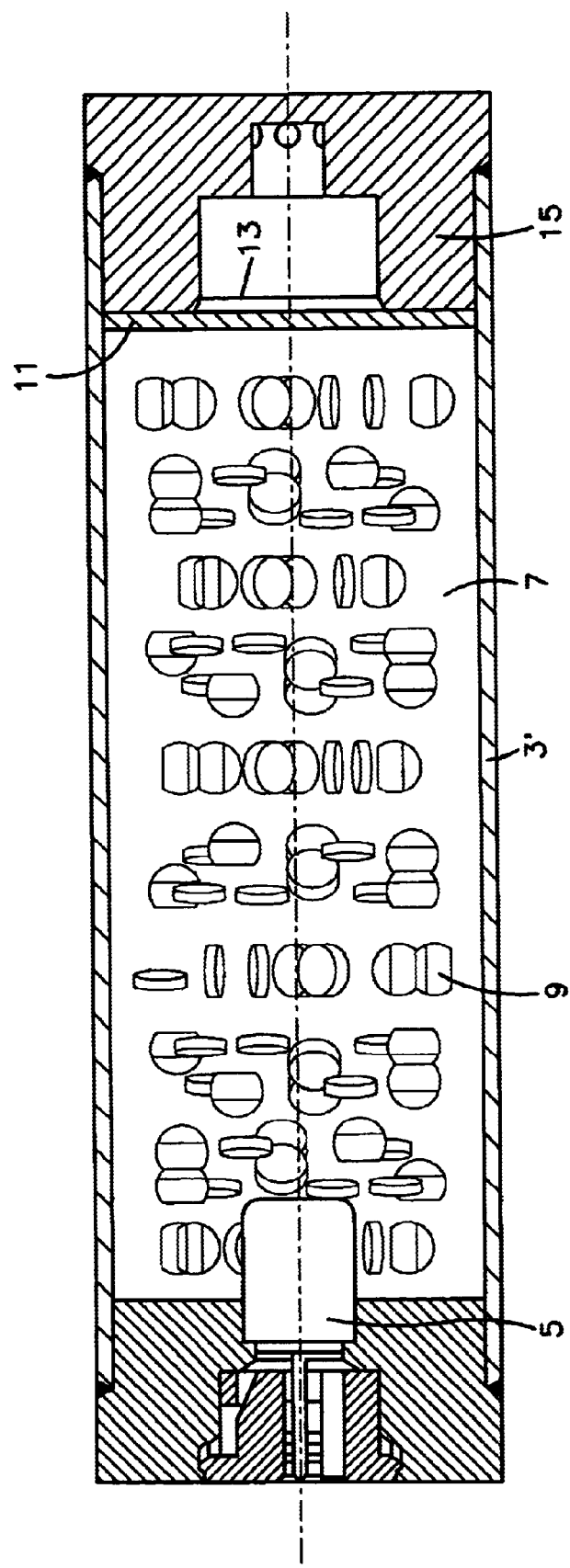
FIG. 2 shows a cross-section through a schematically illustrated passenger's gas generator according to the invention.

The embodiment illustrated in FIG. 2 corresponds in its function to that illustrated in FIG. 1. The housing 3, however, is constructed here as a tubular housing 3'. Otherwise, the parts already explained in connection with FIG. 1 bear the reference numbers which have already been introduced.

Figure 3:
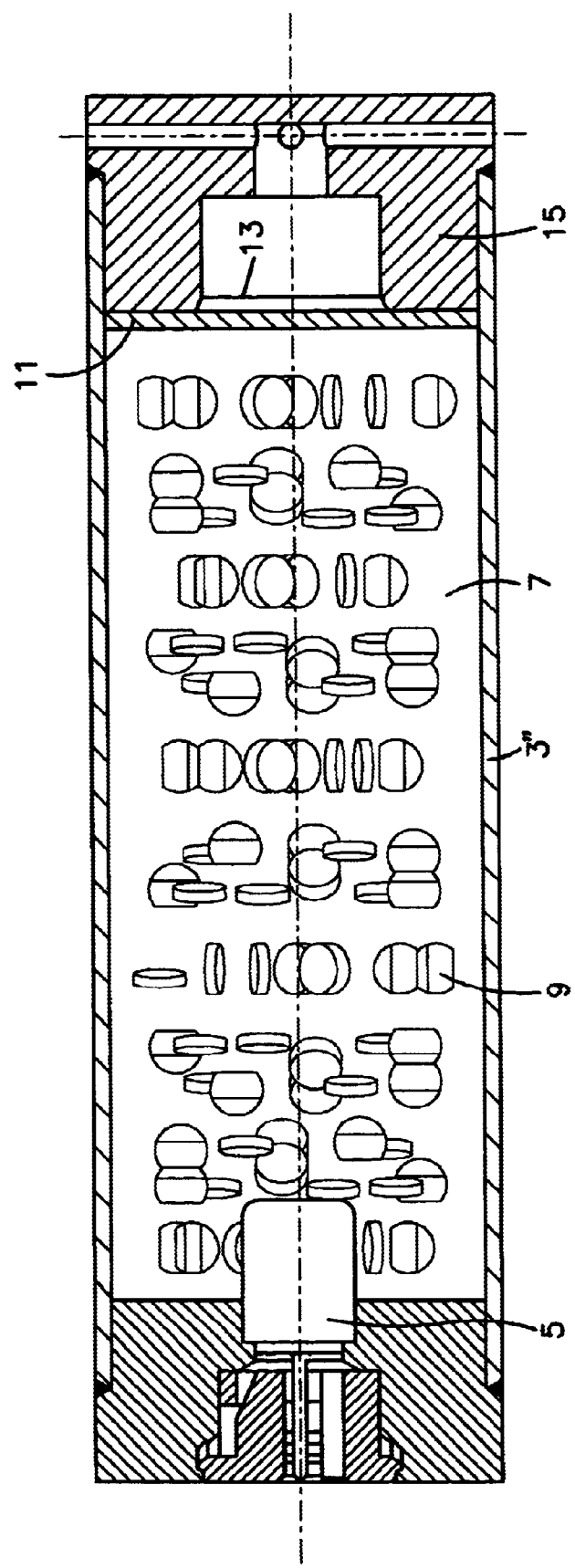
FIG. 3 shows a cross-section through a schematically illustrated side gas generator according to the invention.

The side gas generator illustrated in FIG. 3 differs from that in FIG. 2 in that it takes up a smaller volume and its housing 3" is more elongated in construction. Also in the embodiments shown in FIGS. 2 and 3, the combustion chamber is at the same time a pressure chamber and contains the entire compressed gas which is accommodated in the gas generator.

Figure 4:
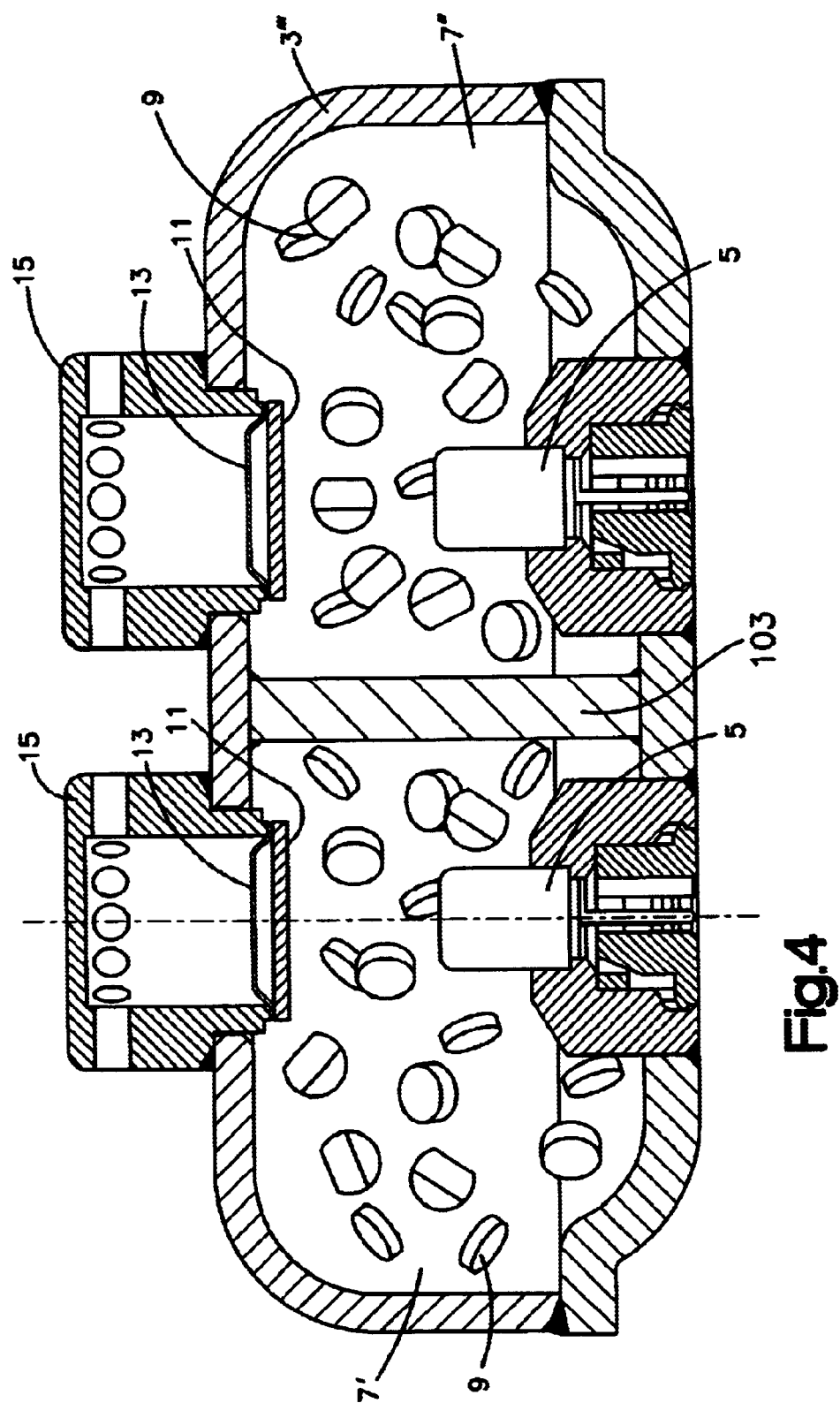
FIG. 4 shows a cross-section through a further embodiment of the gas generator according to the invention, which is constructed in two stages.

The gas generator illustrated in FIG. 4 corresponds, with regard to its construction, substantially to that shown in FIG. 1; however, it is constructed as a two-stage gas generator. For this, an inner wall 103 separates the combustion chamber according to FIG. 1 into two combustion chambers 7' and 7", which are each hermetically sealed and do not have any flow connection with respect to each other. Also, the two chambers 7' and 7" are filled accordingly with compressed gas. Each stage has its own igniter 5 and also its own outlet with the filter 11, the bursting membrane 13 and the diffuser 15. The two stages can be ignited independently of each other. The pressure of the gas inside the combustion chambers 7' and 7" can be identical or different; however it amounts to at least 10 bar.

Also in this embodiment, for each stage the quantity of the solid propellant 9 is coordinated with the quantity of the compressed gas contained in the corresponding combustion chamber 7', 7", and the quantity of the generated moles gas from the solid propellant is greater than the quantity of moles compressed gas in the corresponding combustion chamber 7', 7".

Figure 5:
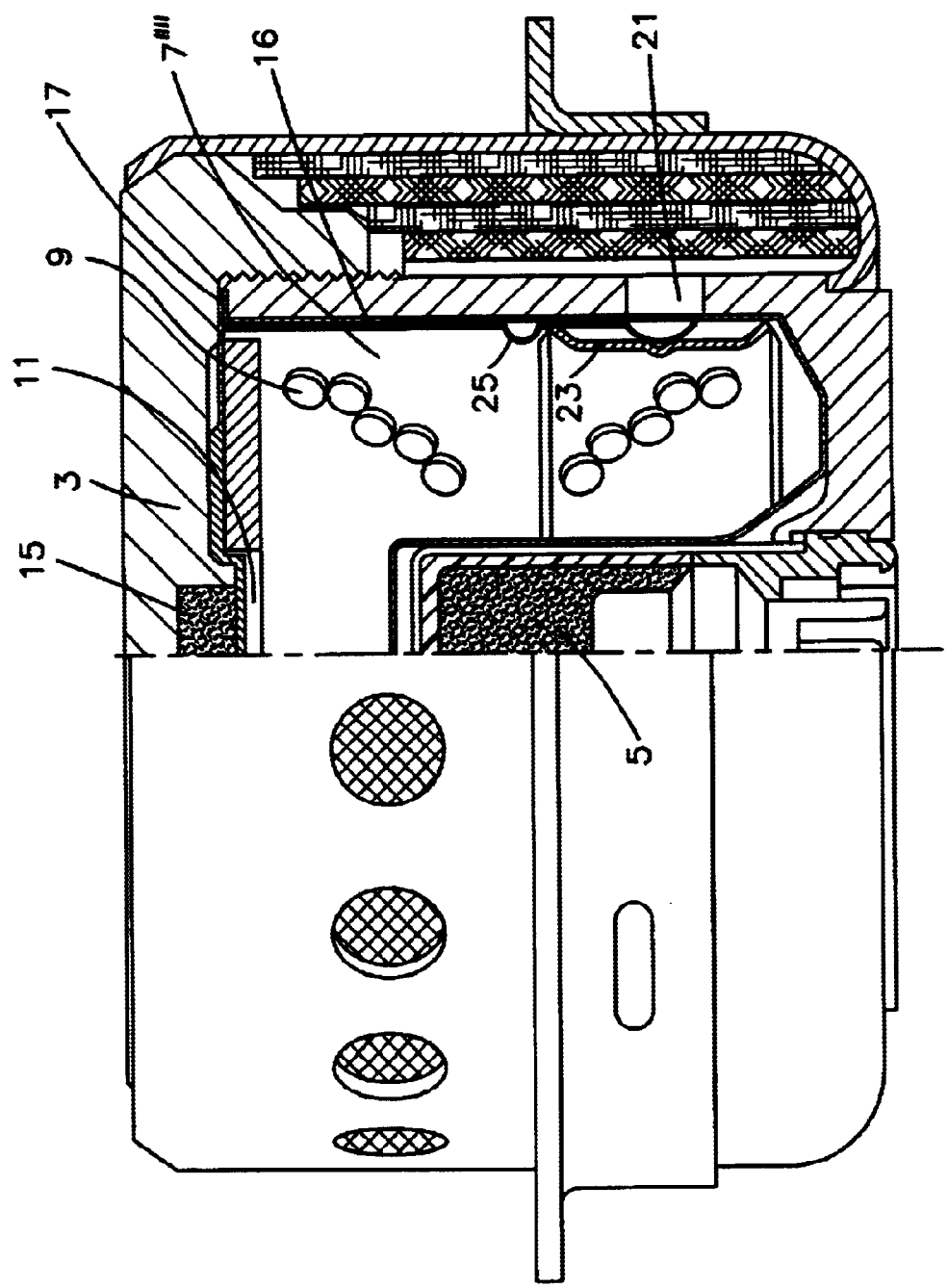
FIG. 5 shows a cross-section through a further embodiment of the gas generator according to the invention with a combustion chamber constructed as a can.

The gas generator illustrated in FIG. 5 corresponds as regards its structure substantially to the single-stage gas generator shown in FIG. 1. The gas generator has a housing 3 which is constructed so as to be gas-tight. In the housing 3 an ignition device 5 is accommodated. A can 16 is integrated into the interior space of the housing 3. The can 16 is constructed as a separate component and is axially clamped in the housing in the region of the ignition device 5 with recessing thereof. The interior space of the can 16 forms the combustion chamber 7''' of the gas generator. In the can 16, the pyrotechnic propellant 9 is accommodated, surrounded by a fixedly defined gas mixture.

The can 16 is produced from thin sheet metal which merely has one joint site 17 which is closed so as to be tight with respect to helium. The wall thickness of the gas-tight can 16 is approximately 0.3 to 1 mm. The outer contour of the can 16 follows the inner contour of the housing 3 of the gas generator, so that the combustion chamber 7''' formed by the can 16 completely fills the housing interior space of the housing 3. A rupture membrane in the region between filter 11 and diffuser 15 is not necessary. The can, which at the same time forms the combustion chamber 7''' as well as the pressure chamber, receives compressed gas with a pressure of 10 to 20 bar. Owing to the pressure conditions of smaller dimensions within the can 16 in the range of 10 to 20 bar, it is no longer necessary to construct the gas generator housing so as to be pressure-tight. Welding technique in the manufacture of these gas generator housings can be dispensed with and other forms of connection such as screwing or flanging can be used. Advantageous in addition to this is the fact that a gas-tight sealing of component transitions on the housing is no longer necessary owing to the small excess pressure in the range of >10 bar to 20 bar, which is received by the can 16. In the can 16, in the region of the radial overflow openings 21, a filter 23 is provided in the form of a circular ring, which lies against the inner wall of the can 16. On the periphery of the wall of the can 16, several indentations 25 are provided, which serve for fixing the filter 23 in position.

Also in this embodiment, the quantity of solid propellant 9 is coordinated with the quantity of compressed gas contained in the can 16, and the quantity of the generated moles gas from the solid propellant is greater than the quantity of moles compressed gas in the can 16.

What is claimed is:

1. A gas generator for generating gases, comprising:

a housing which has an interior space; and at least one combustion chamber defined by a wall having an outflow opening which is closed in a non-activated state of said gas generator and containing a predetermined quantity of solid propellant, said propellant comprising a plurality of solid propellant parts arranged in said combustion chamber in an irregular manner;

compressed gas being stored in a predetermined quantity of moles in said combustion chamber and being in contact with said solid propellant parts when said gas generator is in a non-activated state, said combustion chamber being constructed as a pressure chamber sealed hermetically towards outside of said combustion chamber in the non-activated state of said gas generator;

said quantity of said solid propellant parts being ignited to produce a quantity of moles of gas generated from said solid propellant parts which is greater than the quantity of moles of said compressed gas.

2. The gas generator according to claim 1, wherein, in said gas generator, said at least one combustion chamber containing propellant is the only chamber filled with compressed gas.

3. The gas generator according to claim 1, wherein said combustion chamber is constructed as a separate, gas-tight can.

4. The gas generator according to claim 3, wherein said can consists of a thin sheet metal material.

5. The gas generator according to claim 3, wherein said gas-tight can has an outer shape adapted to said interior space of said housing.

6. The gas generator according to claim 3, wherein a bursting means and a screen are provided and wherein said gas-tight can has said bursting means in a region of overflow openings, in particular in a region of said screen.

7. The gas generator according to claim 3, wherein said gas-tight can is axially clamped in said interior space of said housing.

8. The gas generator according to claim 3, wherein said gas-tight can stores compressed gas with a pressure in a range from 10 to 20 bar.

9. The gas generator according to claim 1, wherein said solid propellant parts are one of tablet formed bodies and extruded shaped bodies.

10. The gas generator according to claim 1, wherein said compressed gas is a gas mixture containing oxygen.

11. The gas generator according to claim 10, wherein said solid propellant is under-balanced with respect to oxygen.

12. The gas generator according to claim 1, wherein said compressed gas is stored at a pressure of at least 10 bar in said combustion chamber.

13. The gas generator according to claim 1, wherein said compressed gas is stored with a pressure of approximately 200 bar in said combustion chamber.

14. A gas generator for generating gases, comprising:

a housing which has an interior space; and at least one combustion chamber defined by a wall having an outflow opening which is closed in a non-activated state of said gas generator and containing a predetermined quantity of solid propellant, said propellant comprising a plurality of solid propellant parts arranged in said combustion chamber in an irregular manner;

compressed gas being at a pressure of at least 10 bar stored in a predetermined quantity in said combustion chamber and being in contact with said solid propellant parts when said gas generator is in a non-activated state, said combustion chamber being constructed as a pressure chamber sealed hermetically towards outside of said combustion chamber in the non-activated state of said gas generator, said at least one combustion chamber containing propellant being the only chamber containing compressed gas.

15. A gas generator for generating gases, comprising:

a housing which has an interior space; and at least one combustion chamber defined by a wall having an outflow opening which is closed in a non-activated state of said gas generator and containing a predetermined quantity of solid propellant, said propellant comprising a plurality of propellant parts arranged in said combustion chamber in an irregular manner;

compressed gas being stored in a predetermined quantity in said combustion chamber and being in contact with said solid propellant parts when said gas generator is in a non-activated state, said combustion chamber being constructed as a helium-tight pressure chamber sealed hermetically towards outside of said combustion chamber in the non-activated state of said gas generator, said at least one combustion chamber containing propellant being the only chamber containing compressed gas.

* * * * *